United States Patent
Chu

(10) Patent No.: US 9,532,112 B2
(45) Date of Patent: Dec. 27, 2016

(54) METHOD AND SYSTEM OF PROVIDING A VIRTUAL COMMUNITY FOR PARTICIPATION IN A REMOTE EVENT

(71) Applicant: Verizon Patent and Licensing Inc., Basking Ridge, NJ (US)

(72) Inventor: Andrew Chu, Richardson, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 105 days.

(21) Appl. No.: 14/165,007

(22) Filed: Jan. 27, 2014

(65) Prior Publication Data

US 2014/0143819 A1 May 22, 2014

Related U.S. Application Data

(63) Continuation of application No. 11/616,443, filed on Dec. 27, 2006, now Pat. No. 8,656,440.

(51) Int. Cl.
| | |
|---|---|
| H04N 21/81 | (2011.01) |
| H04N 5/232 | (2006.01) |
| H04N 7/16 | (2011.01) |
| H04N 7/173 | (2011.01) |
| H04N 21/254 | (2011.01) |
| H04N 21/4223 | (2011.01) |
| H04N 21/472 | (2011.01) |
| H04N 21/475 | (2011.01) |
| H04N 21/478 | (2011.01) |
| H04N 21/4788 | (2011.01) |
| H04N 21/6405 | (2011.01) |
| H04L 29/06 | (2006.01) |

(52) U.S. Cl.
CPC ............ *H04N 21/816* (2013.01); *H04N 5/232* (2013.01); *H04N 5/23206* (2013.01); *H04N 7/165* (2013.01); *H04N 7/17318* (2013.01); *H04N 21/2542* (2013.01); *H04N 21/4223* (2013.01); *H04N 21/4753* (2013.01); *H04N 21/4781* (2013.01); *H04N 21/4788* (2013.01); *H04N 21/47205* (2013.01); *H04N 21/47815* (2013.01); *H04N 21/6405* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 4,992,866 | A * | 2/1991 | Morgan | ........... G08B 13/19641 340/3.71 |
| 5,600,368 | A | 2/1997 | Matthews | |
| 5,729,471 | A * | 3/1998 | Jain | ........................ H04N 5/222 345/419 |
| 6,002,768 | A | 12/1999 | Albanese et al. | |

(Continued)

FOREIGN PATENT DOCUMENTS

| | | |
|---|---|---|
| CN | 1756348 | 4/2006 |
| EP | 1331751 | 7/2003 |
| WO | 2005/029445 | 3/2005 |

*Primary Examiner* — Michael Osinski

(57) ABSTRACT

An approach is provided for establishing a virtual community for remotely participating in an event. A remote camera set is controlled by a user equipment to view an event from a plurality of viewing perspectives. A virtual community is built to share viewing of the event by multiple participants.

17 Claims, 7 Drawing Sheets

(56) References Cited

U.S. PATENT DOCUMENTS

| | | | |
|---|---|---|---|
| 6,002,995 A * | 12/1999 | Suzuki | H04N 5/232 |
| | | | 348/143 |
| 6,137,485 A | 10/2000 | Kawai et al. | |
| 6,144,375 A | 11/2000 | Jain et al. | |
| 6,271,752 B1 | 8/2001 | Vaios | |
| 6,278,461 B1 * | 8/2001 | Ellenby | G01C 17/34 |
| | | | 345/427 |
| 6,529,234 B2 * | 3/2003 | Urisaka | H04N 7/181 |
| | | | 348/143 |
| 6,563,529 B1 * | 5/2003 | Jongerius | H04N 5/23238 |
| | | | 345/629 |
| 6,658,091 B1 | 12/2003 | Naidoo et al. | |
| 6,675,386 B1 | 1/2004 | Hendricks et al. | |
| 6,714,238 B2 | 3/2004 | Urisaka et al. | |
| 6,850,496 B1 | 2/2005 | Knappe et al. | |
| 6,856,346 B1 | 2/2005 | Kobayashi et al. | |
| 6,897,891 B2 | 5/2005 | Itsukaichi | |
| 6,919,921 B1 | 7/2005 | Morota et al. | |
| 6,965,399 B1 | 11/2005 | Oka et al. | |
| 7,106,360 B1 | 9/2006 | Frederick | |
| 7,373,395 B2 | 5/2008 | Brailean et al. | |
| 7,382,397 B2 | 6/2008 | Mottur | |
| 7,782,363 B2 | 8/2010 | Ortiz | |
| 8,010,631 B2 | 8/2011 | Brailean et al. | |
| 8,089,520 B2 | 1/2012 | Ko et al. | |
| 8,103,545 B2 | 1/2012 | Ramer et al. | |
| 8,364,521 B2 | 1/2013 | Ramer | |
| 8,366,531 B2 | 2/2013 | Walker et al. | |
| 8,531,522 B2 * | 9/2013 | Horovitz | H04N 7/181 |
| | | | 348/143 |
| 8,675,073 B2 * | 3/2014 | Aagaard | H04N 7/181 |
| | | | 348/157 |
| 2002/0070952 A1 * | 6/2002 | Hoch | G06T 15/20 |
| | | | 345/647 |
| 2003/0093430 A1 | 5/2003 | Mottur | |
| 2003/0206232 A1 | 11/2003 | Suzuki et al. | |
| 2004/0056964 A1 | 3/2004 | Kawai et al. | |
| 2004/0148353 A1 | 7/2004 | Karaoguz et al. | |
| 2004/0163118 A1 | 8/2004 | Mottur | |
| 2004/0239688 A1 * | 12/2004 | Krajec | G01S 5/0257 |
| | | | 345/629 |
| 2005/0181765 A1 | 8/2005 | Mark | |
| 2005/0207672 A1 * | 9/2005 | Bernardo | G01C 11/02 |
| | | | 382/284 |
| 2005/0289627 A1 | 12/2005 | Lohman | |
| 2006/0001757 A1 * | 1/2006 | Sawachi | G01C 21/20 |
| | | | 348/333.12 |
| 2006/0007308 A1 * | 1/2006 | Ide | G01S 3/7864 |
| | | | 348/143 |
| 2006/0010199 A1 | 1/2006 | Brailean et al. | |
| 2006/0217113 A1 | 9/2006 | Rao et al. | |
| 2006/0294012 A1 | 12/2006 | Brattesani et al. | |
| 2007/0008408 A1 * | 1/2007 | Zehavi | G08B 13/19613 |
| | | | 348/143 |
| 2007/0250900 A1 | 10/2007 | Marcuvitz | |
| 2008/0084473 A1 * | 4/2008 | Romanowich | G08B 13/19671 |
| | | | 348/135 |
| 2008/0088706 A1 * | 4/2008 | Girgensohn | H04N 7/181 |
| | | | 348/207.99 |
| 2009/0238417 A1 * | 9/2009 | Nielsen | G06F 17/3087 |
| | | | 382/113 |
| 2009/0265105 A1 * | 10/2009 | Davis | G01C 21/20 |
| | | | 701/300 |
| 2011/0153136 A1 * | 6/2011 | Anderson | G05D 1/0219 |
| | | | 701/25 |

* cited by examiner

METHOD AND SYSTEM OF PROVIDING A VIRTUAL COMMUNITY FOR PARTICIPATION IN A REMOTE EVENT

RELATED APPLICATIONS

This application is a Continuation of U.S. application Ser. No. 11/616,433, filed Dec. 27, 2006 the entirety of which is incorporated herein.

BACKGROUND INFORMATION

Public events, such as sports games, concerts, etc., are routinely televised. However, the viewers' experience is less than satisfying as attendance at these events involve an experience beyond simply a visual one. Other factors that contribute to the user experience at these events include interaction with other attendees and an ability to control one's view of the events. Also, it is noted that attending a game is more than a visual experience, but is a social event in which people spend time with friends and family members. A TV program cannot simulate, for example, a stadium atmosphere, whereby attendees can enjoy interacting with peers and hearing the roars of the crowd. Additionally, traditional television technology only allows a viewer to watch an event from one perspective chosen by the program editors. Hence, the viewer can only passively follow what is provided from the broadcast source, and thereby is prevented from following a favorite player or entertainer. In short, traditional television viewing provides a one dimensional experience.

Moreover, unless the event is truly spectacular, certain potential participants may be disinclined to attend them because of various considerations. For example, traveling to the venue can be extremely burdensome, as traffic is usually problematic, and thus, requires leaving to the event well in advance of the start time. Also, if the venue is of a significant distance, travel time and transportation costs (e.g., gas, maintenance, etc.) can present a serious barrier to attendance.

Television remains the prevalent global medium for entertainment and information. With the convergence of telecommunications and media services, there is increased competition among service providers to offer more services and features to consumers, and concomitantly develop new revenue sources. Traditional telecommunication companies are entering the arena of media services that have been within the exclusive domain of cable (or satellite) television service providers. Little focus has been paid to enhancing user control of their viewing experience.

Therefore, there is a need for providing features that enhance user experience during broadcast of an event.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus, method, and software for viewing an event as part of a virtual community are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Figure 1:
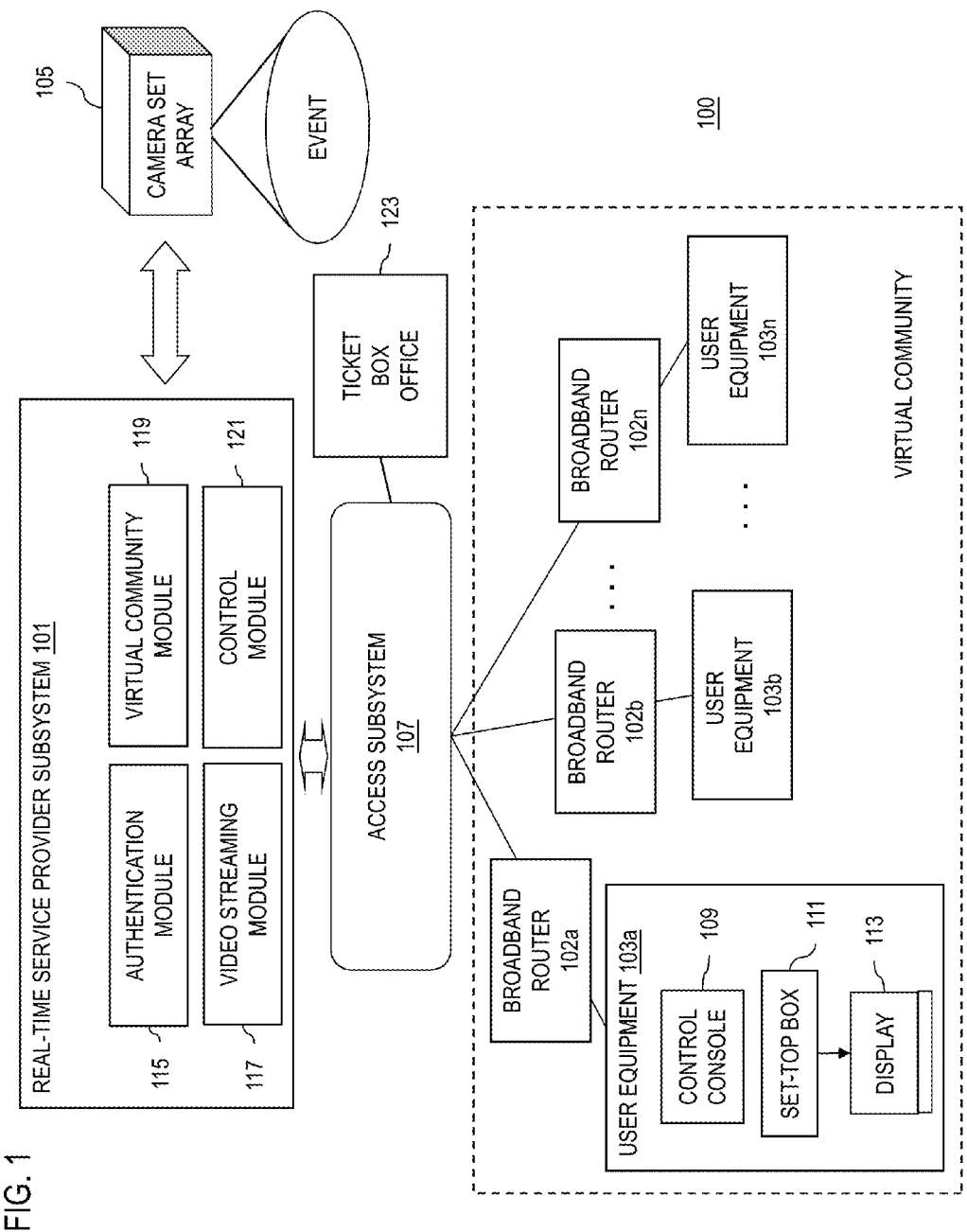
FIG. 1 is a diagram of a video system capable of providing a virtual community for viewing an event, according with an exemplary embodiment.

FIG. 1 is a diagram of a video system capable of providing a virtual community for viewing an event, according with an exemplary embodiment. A video system 100 includes a real-time service provider subsystem 101 for permitting users via user equipment 103 to attend an event using an array of camera sets 105. In the manner, a user can watch a game or show through a dedicated, remotely controllable camera and microphone (which constitutes, in an exemplary embodiment, a camera set), while interacting with other virtual spectators through private communications channels. The system 100 thus provides a virtual community of users to experience a common event.

An access subsystem 107 can employ various broadband access technologies including digital subscriber line (DSL), FiOS (Fiber Optic Services), cable and WiMAX (Worldwide Interoperability for Microwave Access), to connect the user equipment 103a-103n to services of the real-time service provider subsystem 101. As shown, according to one embodiment, the user equipment 103 includes a control console 109, and a set-top box 111 that outputs to a display 113. The display 113 and set-top box 111 can support high resolution video streams, such as high definition TV (HDTV). The set top box 111 can encapsulate data into proper format with required credentials before transmitting onto the network 107 through a local broadband router 102a, and de-encapsulate the incoming traffic to dispatch the data to the HDTV display 113, voice channel, or control console 109, depending on the destination of the data. In an exemplary embodiment, assuming the HDTV display 113 is Internet Protocol (IP) capable (i.e., the display includes an IP stack, or is otherwise network addressable), the function of the set top box 111 might be assumed by the display 113. For example, an IP ready HDTV display 113 can directly connected to the broadband router, whereas a local network switch port is provided on the HDTV to route the IP traffic between the broadband router and the control console 109. The control console can be either a separate PC (Personal Computer) or integrated into the HDTV with a keyboard and mouse. Although the control console 109, the set-top box 111, and the display 113 are shown as separate components, it is contemplated that these components can be integrated in various combinations.

In one embodiment, the real-time service provider subsystem 101 utilizes an authentication module 115 to perform authentication services of the participant. A video streaming module 117 is used to acquire video feeds from the camera set array 105 and to transmit the feeds over the access subsystem 109 to the particular user equipment. The system 100 supports end-to-end data encryption with the video streaming services (when enabled) so that only legitimate users are able to view the content.

A virtual community module 119 is included in the subsystem 101 to provide user functions for community building, such as communication establishment among the participants and sharing and/or exchanging of views. The real-time service provider subsystem 101 also has a control module 121 to act as a proxy for a user to remotely control a camera set 105.

The control console 109, in an exemplary embodiment, includes an input device, such as a keyboard and/or a mouse, to establish credentials with the authentication module 115, to communicate with the virtual community module 119 to start or join a virtual community, and to establish connectivity with other users. The control console 109 can also a joy stick (or the mouse or keyboard), to control the remote camera set 105.

A ticket box office 123 permits users to purchase tickets for an event, thereby reserving a virtual seat at the arena. This entails assignment of a camera set 105 within the array deployed at the arena. Such capability provides greater flexibility in viewing choices, in that certain events are not broadcasted. For example, local sports games are routinely "blacked out." Also, during an Olympic game, for instance, unpopular events may receive little or no coverage.

Figure 2:
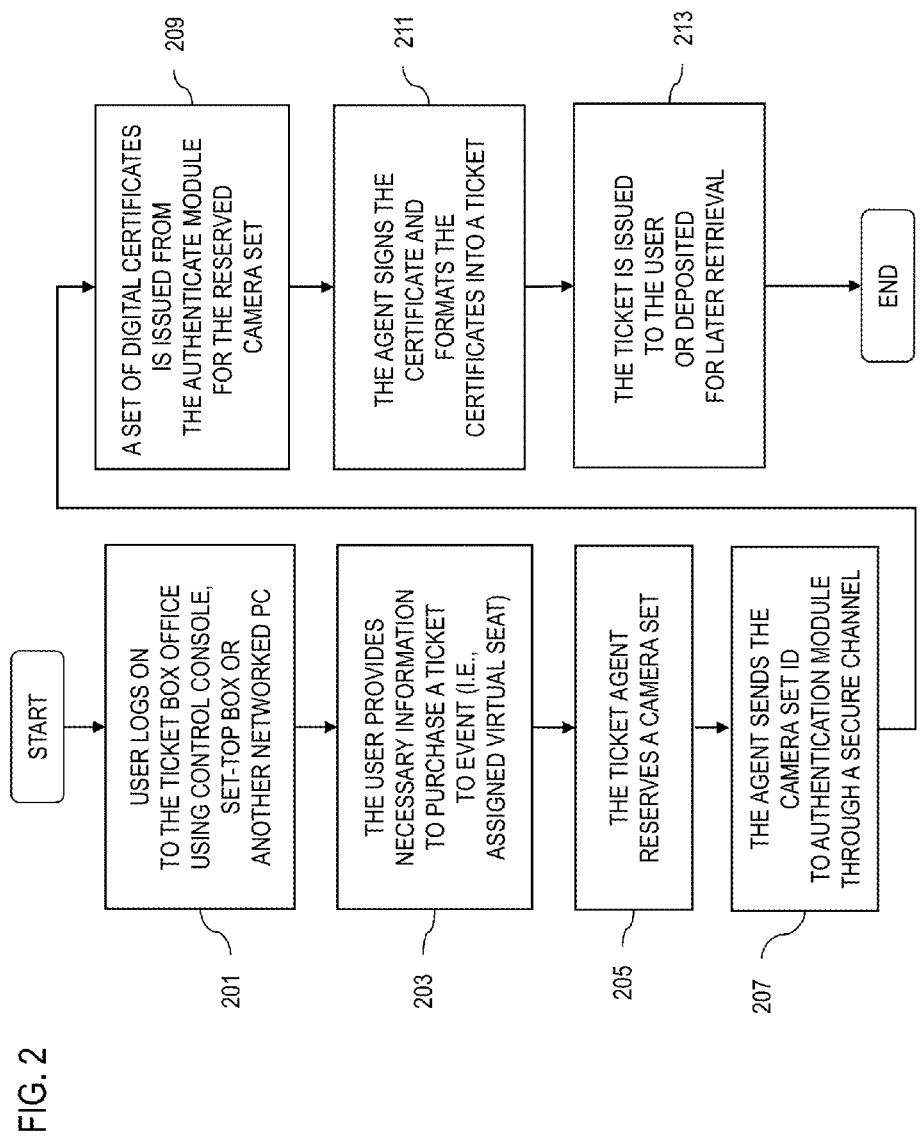
FIG. 2 is a flowchart of a process for purchasing a virtual seat to an event, according to an exemplary embodiment.
Figure 6:
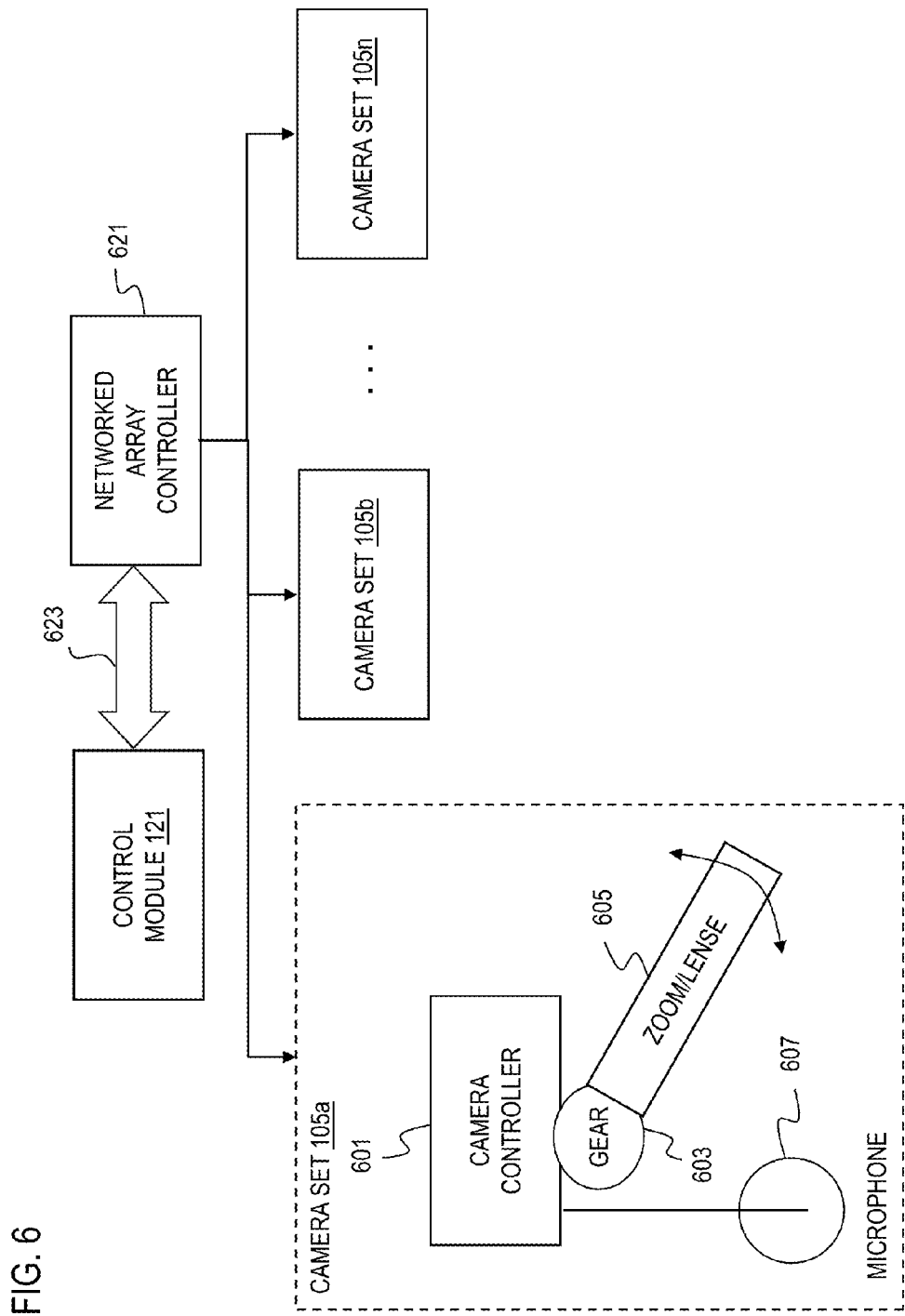
FIG. 6 is a diagram of an exemplary camera array used in the system of FIG. 1, according to an exemplary embodiment.

FIG. 2 is a flowchart of a process for purchasing a virtual seat to an event, according to an exemplary embodiment. In this example, a user logs on using, for example, the control console 109 (per step 201) to access the ticket box office 123. Alternatively, the user can select an appropriate menu supplied by the set-top box 111, which may be web-enabled. The console 109 accesses the ticket box office 123 to purchase a ticket, thereby obtaining a virtual seat to the event (step 203). The purchase can be conducted by a credit card transaction. The information required for a successful purchase transaction includes the information of user's credit card and the credentials of the user equipment 103. The information can be provided during the purchase or through a pre-registered user account with the ticket box office 123. The user equipment's credential typically includes the IP address or the IP address of an associated proxy server (not shown), and a digital certificate. The user wants to purchase a ticket for one virtual seat for a coming Friday's game in France, for instance. The ticket box office 123 maps the purchase to a camera set 105a as shown in FIG. 6, effectively reserving the camera set 105a for the purchaser (step 205). The ticket agent then sends the reserved camera set ID to authentication module 115 through a secure channel (step 207). Upon validating the agent's request, the authentication module 115 issues a set of digital certifications for the corresponding camera set 105, and sends the certificates back to the agent (step 209). The agent digitally signs the certificates and delivers them to the user in a form of ticket (step 211). The ticket can be delivered to the user at the end of the purchase, or can be deposited into a secured website for user to retrieve later at the game time (step 213). The ticket ensures one night rental of a specific camera 105 for the coming Friday game. The event may be among multiple events, as next explained with respect to FIG. 3.

Figure 3:
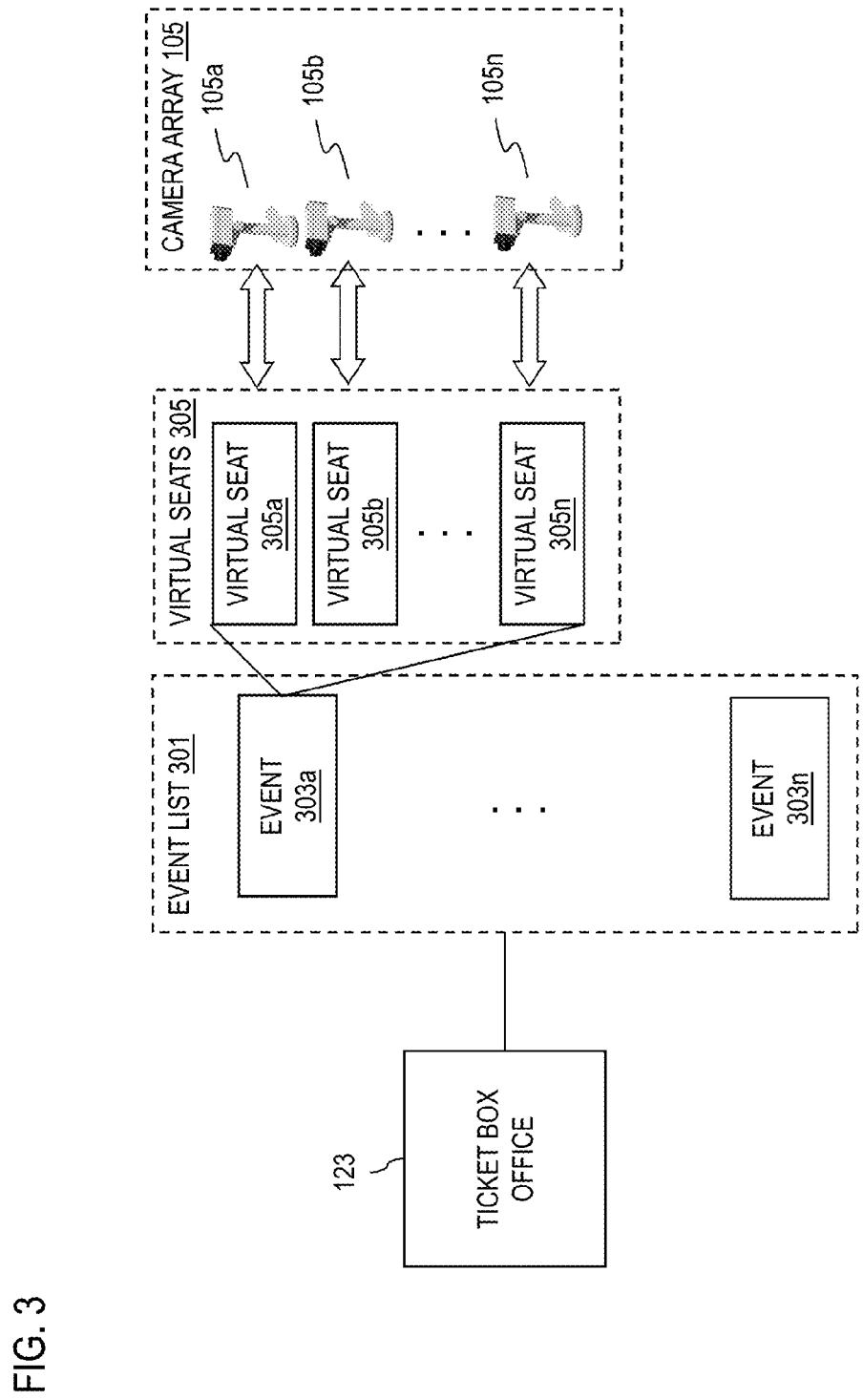
FIG. 3 is a diagram of an online ticket box office for purchasing a virtual seat to an event, according to an exemplary embodiment.

FIG. 3 is a diagram of an online ticket box office for purchasing a virtual seat to an event, according to an exemplary embodiment. The online ticket box office 123 can present to a user an event list 301. The list 301 can be displayed using a browser or any other graphical user interface (GUI) resident on the control console 109. As seen, multiple events 303a-303n are enumerated and can be categorized by various parameters, such as date, venue, artists, sports team, etc. Additionally, each of the events (e.g., event 303a) includes virtual seats 305a-305n. These virtual seats 305a-305n map to camera sets 105a-105n.

With the ticket box office 123, a user (or customer) can book a virtual seat with which the user can remotely participate in a sports event (e.g., basketball game). In addition, the events can include such public affairs or news worthy events, as a presidential inauguration ceremony, an Olympic Games, a New Year celebration in Time Square, music performances in Vienna, etc.

Figure 4:
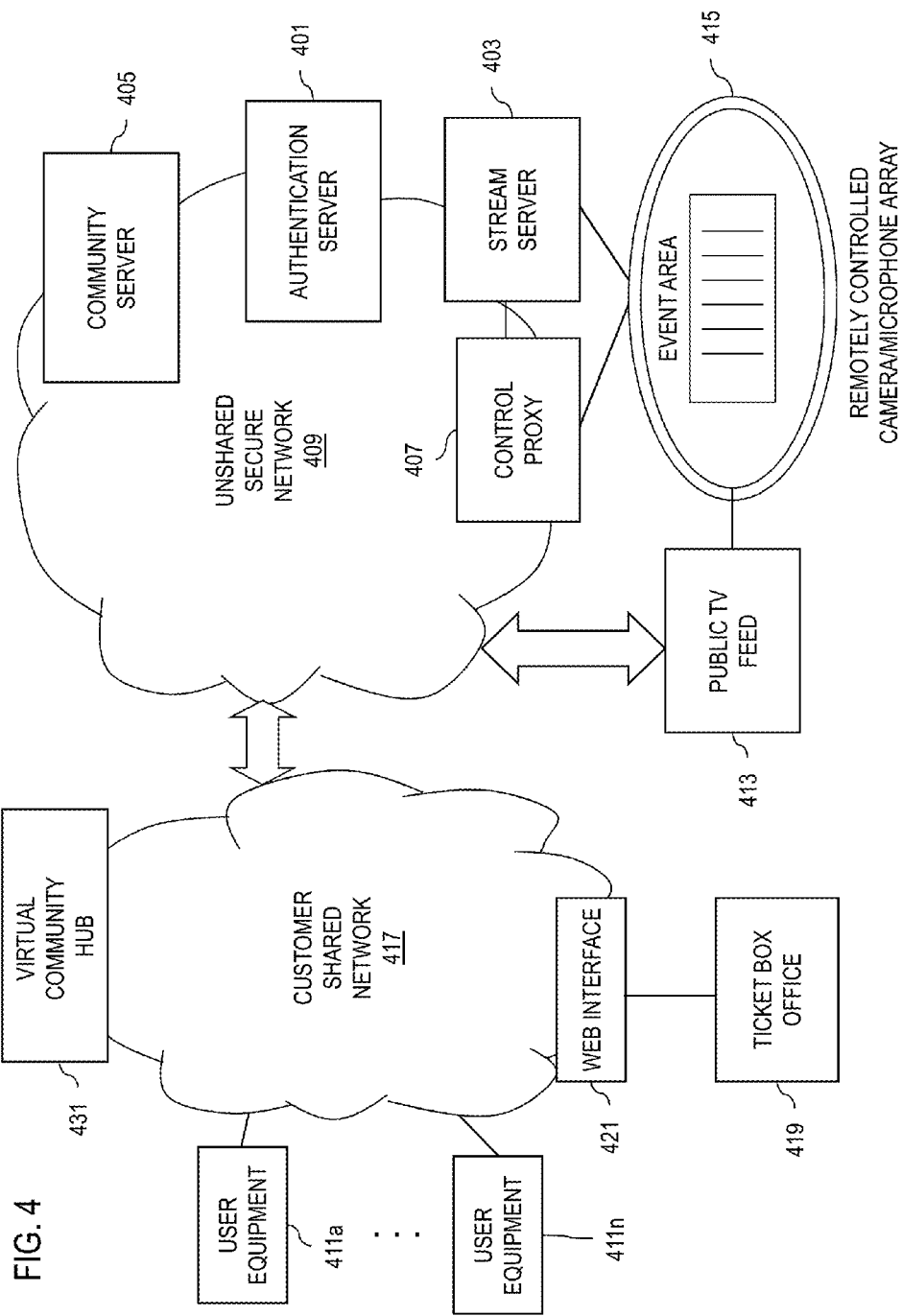
FIG. 4 is a diagram of an exemplary architecture of the system of FIG. 1, according to an exemplary embodiment.

FIG. 4 is a diagram of an exemplary architecture of the system of FIG. 1, according to an exemplary embodiment. Under this scenario, an authentication server 401, stream server 403 and a community server 405, along with a control proxy 407, constitute a real-time service provider subsystem. The components communicate using an unshared secure network 409. The authentication server 401 is a security device (or entity) that authenticates a user, authorizes services to the user, and maintains the authentication until the end of the prescribed period of time. The authentication server 401 can be, for example, a Kerberos based key issuing server, or can be a proprietary protocol based system; however, it is contemplated that other network authentication protocols can be utilized. Once a user is authenticated, connections from user equipment 411 to other servers are established directly, without involvement directly from the authentication server 401. The authentication server 401 can also grant a user the right to switch from one camera set 105a to another by revoking the existing digital certificates associated with the ticket, and issuing a new set of digitals certificates that is mapped to another camera set 105b. The user's set-top box 111 can then start a new session from the new camera set 105b, whereas the previous session is automatically closed because of the revocation of the "old" or prior certificates associated with the old ticket.

Video and audio data flow generated from the camera set 105 is first forwarded to the video stream server 403 for further processing. The video stream server 403 performs the video stream coding/decoding (codec), compression and encryption (if required) before the data stream is passed onto the network 409. The server 403 also provides video frame mixing if more than two video channels are subscribed at the same time by a user, wherein one channel is a private channel while the other could be a public TV feed (or channel) 413. The video and audio data are thereafter delivered from the stream server 403 to the user equipment 411.

Another service that is provided by the stream server 403 involves adding a "virtual grid" over the camera view if demanded by the customer. A virtual grid is the visualization of a coordinate system that is mapped to the geographical area of the event. The values of the coordinates are dependent only on the geographical location, and are independent of the viewing perspective from the users. For example, one embodiment of a virtual grid is the GPS coordinates projected as a light colored mesh over the viewing field. Each physical spot can be uniquely identified within a section of the virtual grid, regardless of different viewing angles from different camera sets. With the virtual grid, the customer can identify the location of an event in the view with their virtual community. The use of the virtual grid can thus provide different users a common reference when the subject of interest is viewed from individual angles.

The community server 405 maintains, for example, a username, customer CPE (customer premises equipment) IP addresses, and the credentials issued by the authentication server 401. After the user equipment 411 initiates establishment of a connection with the community server 405, a virtual community list is sent to the user who can pick from the list to join the community. A new community can be established when a user creates a new entry into the community list.

The control signal proxy 407 serves as a protocol gateway, which takes the customer's control signal to the camera, potentially converting the signals to the protocol that the camera is compatible with, and passes the converted signals to the camera 415. Also, the control signal proxy 407 takes a camera's feed back and passes the feed onto the customer's control console, which provides a "dashboard" to display the status of the camera set (e.g., 105a . . . 105n), such as the angles of the camera's lens, the aperture of the zoom and microphone volume.

In this example, a customer shared network 417 serves as an access network, which can be a wired (e.g., FiOS, DSL, cable, etc.) or a wireless system. The customer shared network 417, in an exemplary embodiment, supports broadband services with QoS (Quality of Service) mechanisms to ensure adequate video and audio quality. The access network 417 can supply high speed down stream links, e.g., 6 Mbps or more. The bandwidth requirement for the access network 417 is not only determined by the video stream from the stream server 403, but also the traffic stemming from the capability to control the cameras 415 as well as communication exchange within the virtual community. Such virtual community traffic, for example, includes multi-channel phone conversations and video/graphic exchange among the virtual neighbors. During view of the event, the user can choose to listen to a commentator, or open a small window on the display to watch the public TV feed 413. Under this arrangement, the user can follow the subject of interests instead of passively following a broadcast TV program. The system allows a user to participate a game that is occurring thousands miles away, and shares the game with their virtual community that can spread over the entire globe.

The access network 417 can provide secure communication for the virtual community members. A dynamical routing protocol can assist with quickly building and updating a full mesh network for the virtual community. In one embodiment, the access network 417 also provides connection between customers and an online ticket box office 419, which can support a web interface 421 (e.g., web server) for purchase of virtual seats by the users. There are conceivably multiple types of infrastructures through which virtual community members can communicate. For example, a virtual community can communicate through a virtual community hub 431 that receives and executes computer instructions from the community server 405. This is a more scalable infrastructure for a large virtual community, with shortcomings such as the requirement for additional central processing equipment (the virtual community hub 431) and added latency due to process delays in within the virtual community hub 431. Another way a virtual community can communicate is through a dynamically full-mess private virtual network (VPN) in the customer shared network 417. This infrastructure requires no additional equipment without added latency, but may be limited to smaller establishment of virtual communities, and may require that the VPN be capable of dynamical full meshing either through Layer 2 switching or Layer 3 routing. These layers refer to the Open System Interconnection (OSI) model, according to one embodiment. In yet another infrastructure through which virtual community members can communicate can involve the combination of the above two architectures for a mixture of large and small virtual communities.

Figure 5:
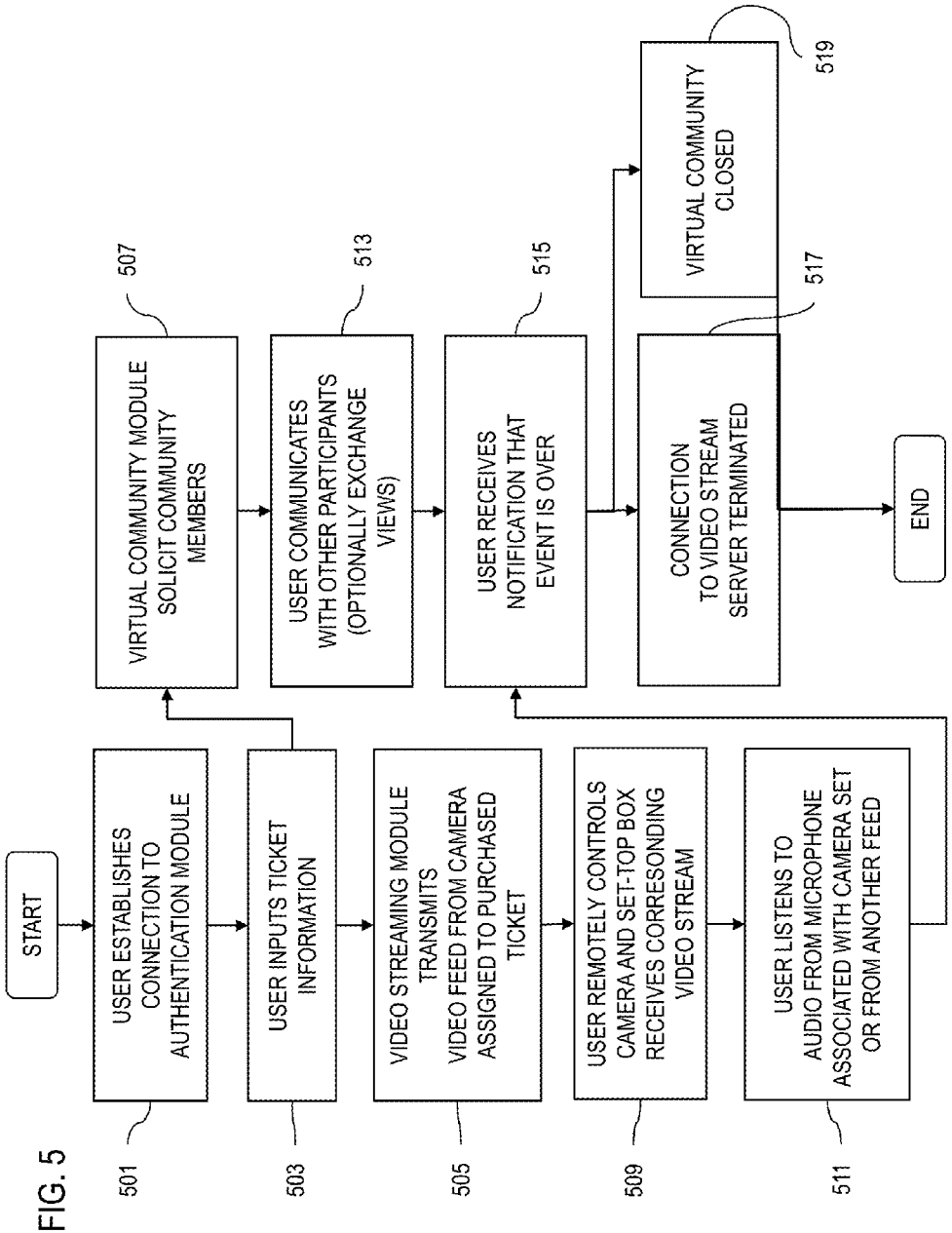
FIG. 5 is a flowchart of a process for participating in a virtual community to view an event, according to an exemplary embodiment.

FIG. 5 is a flowchart of a process for participating in a virtual community to view an event, according to an exemplary embodiment. Continuing with the example of FIG. 3, the user knows of another user, who would enjoy attending the Friday night game as well. This other user can be at a different geographical location—e.g., Canada. The other user undergoes a similar process (of FIG. 3) to purchase a ticket for the Friday event. These users can communicate with each to exchange their virtual community identifiers (e.g., nicknames) so that they may "find" each other during the event.

On the date and time of the event, the user establishes a connection to the authentication module 115 using either console control 109, as in step 501. In step 503, the user inputs the ticket information and other credential information to the real-time service provider subsystem 101. The control console 109 in conjunction with the set-top box 111 can initiate sessions with the video streaming module 117, the control module 407, and the virtual community module 119, with the session keys issued from the authentication module 115. In an exemplary embodiment, the authentication module 115 can effect a Kerberos ticketing system.

In one embodiment, a user can establish a connection to the video streaming module 117 and a connection to the community module 121 as two independent processes. In step 505, the video streaming module 117 can begin transmission of the video stream from the assigned camera set 105 to display 113 of the user. In step 507 in parallel to step 505, the community server 405 starts to solicit community builders. The user thus establishes a community by adding a new entry into the community list advertised by the community server, and requests the other user in Canada to join. Alternatively, a user can initiate a request to be admitted into an established community and subsequently the request is either accepted or denied by the owner or by majority votes.

At this point, the user can remotely control the camera set 105a to freely view the game, as in step 509. After the other user joins the virtual community successfully, the new community member can choose to share views and other information on the display with the entire community or with a selected subset of community members through a full mess VPN or a virtual community hub 431, depending on the infrastructure used to build the communities. The underlying infrastructure may be transparent to the users. During the event, the users can watch the game with their own "eyes," per their respective cameras 105. Also, the Canadian can opt to listen, per step 511, to a local commentator in French, while the first user listens through the microphone. They discuss the game with their common language, English, while periodically sharing their views (or images) in real-time through their virtual community link (step 513). In other words, one user can coordinate with other users in real-time, while watching the same subject from different perspective or the same perspective if they elect to do so.

At the end of the game, the authentication module 115 announces to all connected user equipment 103 that the game is over, and issues a digital certification revocation order, thereby notifying the user (step 515). Per step 517, all communications associated with the event from the stream server 403 are disconnected, and communities established through community server 405 are dissolved (step 519). The termination of the stream service and termination of the virtual community are executed independently.

The above process permit users the capability to enjoy events in their own premises (e.g., living rooms or in a private club), without the drawbacks of traffic, travel costs, and delays. The system 100 allows a much larger community to participate in game, show or other activities; this traditionally has not been possible because of various reasons, such as geographical distance or capacity limitation. Additionally, the video system 100 has been described in the context of entertainment, it is noted that the approach has applicability to other applications. For example, an oil field has many remote sites in deserted regions, which are not suitable for long term habitation. These sites can be monitored by multiple divisions for different purposes. One division is for the maintenance of pipeline, and another for well maintenance. Further, the video system 100 can be deployed as a managed service for such applications.

FIG. 6 is a diagram of an exemplary camera array used in the system of FIG. 1, according to an exemplary embodiment. By way of example, the camera set 105*a* includes a camera controller 601 to interface with the control module 121 through a network array controller 621, thereby permitting the users to control the camera set 105*a*. The networked array controller 621 controls the movement of a plurality of camera sets in the camera array. The networked array controller 621 communicates with the control module 121 through a private connection 623 to receive control signals from the users, and passes camera status back to the users. A motorized gear 603 physically steers the camera in response to user control signals. A zoom mechanism 605 allows the camera to cover the entire view of the court, and to close up with reasonable resolution to an object of interest. The camera set 105*a* can be equipped with a microphone 607 to capture audible sounds accompanying the event. The microphone 607, in an exemplary embodiment, is a telescopic microphone for directing the source of the audio. As mentioned, the user can choose to listen to other publicly shared audio signals, such as a TV broadcast commentator.

The camera set 105*a*, in an exemplary embodiment, may have additional video and audio signal processing elements (not shown) and the outputs are sent to the stream module 117, while incoming control signals from the user are processed through the control module 121 before transmitted to individual camera sets through networked array controller 621. The users do not have direct access to the camera set 105; this provides an added security measure. This arrangement can provide interoperability of remote control protocols, in addition to simplify construction of the camera sets 105*a*-105*n*. For example, the camera sets 105*a*-105*n* can be constructed using off-the-shelf CCTV (closed circuit TV) components, which may use a proprietary control protocol to be converted to the control protocol, through the control module 121, for compatibility with that of the user's control console. The control signals to and from the user can be encoded as encrypted data flow for security and privacy.

In an exemplary embodiment, the camera set 105 can be mounted in a manner that provides reasonable freedom to move the camera lens to a direction without interfering with other neighboring cameras or actual spectators. Also, the space requirement for installation of the camera array can be minimal, as the set 105 need not have to be on the ground. Consequently, more people can effectively to "go to a game."

The above described processes relating to viewing of an event as a virtual community may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
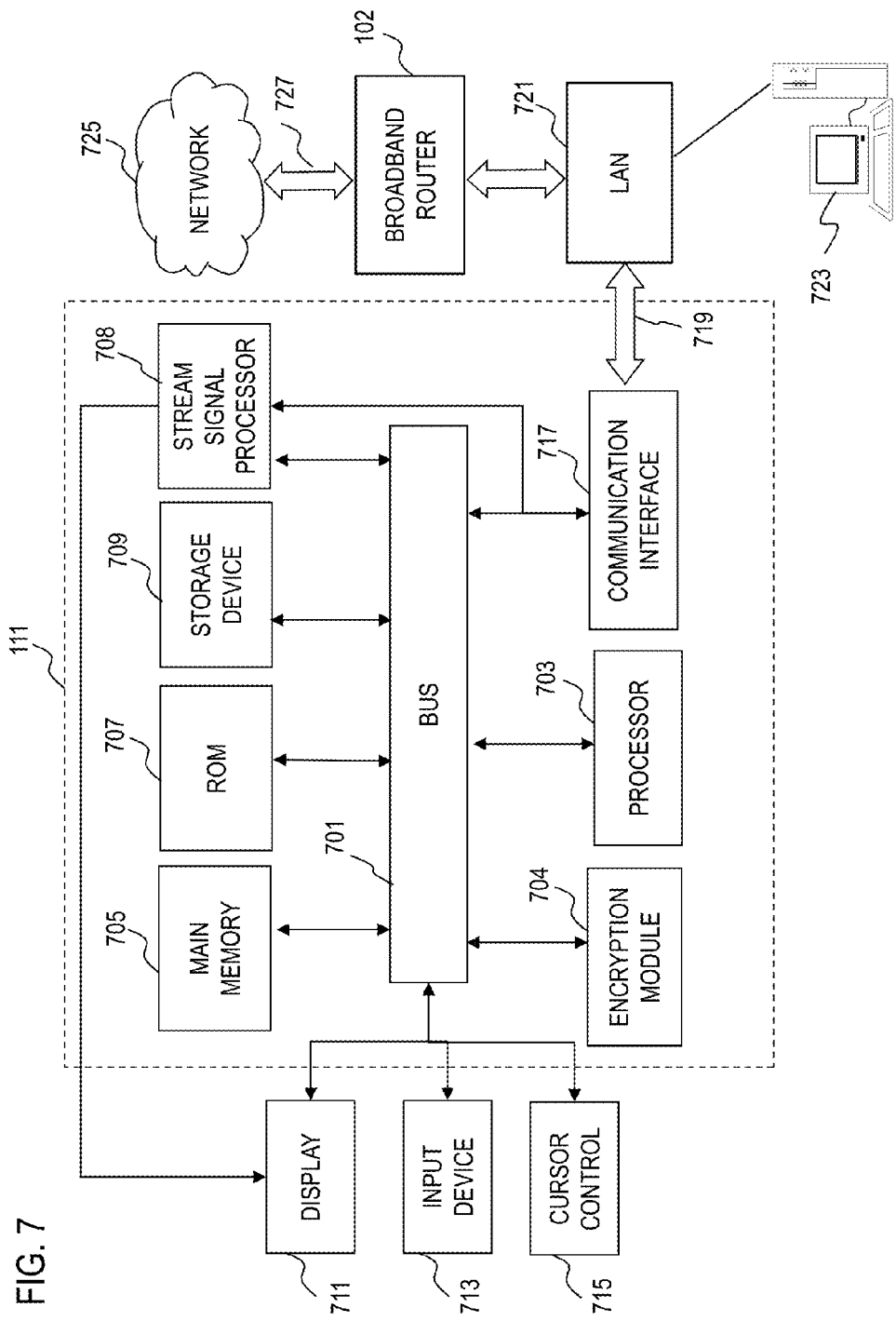
FIG. 7 is a diagram of a computer system that can be used to implement various exemplary embodiments.

FIG. 7 illustrates a computing system deployed as the set-top box 111, according to an exemplary embodiment. The set-top box 111 includes a bus 701 or other communication mechanism for communicating information and a processor 703 coupled to the bus 701 for processing information. The set-top box 111 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The set-top box 111 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The set-top box 111 may be coupled via the bus 701 to a display 711, such as a cathode ray tube (CRT), liquid crystal display, active matrix display, plasma display or a High Definition Television (HDTV), for displaying information to a user. An input device 713, such as a keyboard including alphanumeric and other keys, or a touch screen, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the set-top box 111, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. Encrypted data can be processed by an encryption module 704, which can be implemented with an ASIC or an FPGA [0039] In this multi-processing arrangement, both processor 703 and encryption module 704 are employed to execute the instructions contained in main memory 705. In alternative embodiments, other hard-wired circuitry may be used in place of or in combination with software instructions to implement the exemplary embodiment. Thus, exemplary embodiments are not limited to any specific combination of hardware circuitry and software.

The set-top box 111 also includes a communication interface 717 coupled to bus 701. The communication interface 717 provides a two-way data communication coupling to a network link 719 connected to a local network 721. For example, the communication interface 717 may be an Ethernet™ card to provide a data communication connection to the local network (LAN) 721. Wireless links such as, for example, IEEE (Institute of Electrical and Electronics Engineers) 802.11G with 54 Mbps (Megabit per second) peak data rate can also be deployed as the local network interface. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through LAN 721 to a host computer 723, which is used by the user as the control console. The LAN has connectivity to a network 725 (e.g. a wide area network (WAN) or the global packet data communication network now commonly referred to as the "Internet") or to data equipment operated by a service provider, through a high speed link 727 terminated at the broadband router 102. The high speed interface on the broadband router 102 may be a high speed digital subscriber line (DSL) card, a cable modem, an optical fiber modem, or any other high speed communication interface to provide a data communication connection to a corresponding type of communication line. The local network 721, broadband router 102 and the network 725 all use electrical, electromagnetic, or optical signals to convey information and instructions. The signals through the various networks and the signals on the network link 719 and through the communication interface 717 are exemplary forms of carrier waves bearing the information and instructions. In this particular example, stream data flow is directly sent from the communication interface 717 to a stream processor 708. The stream processor 708 performs various signal transforming and conditioning functions such as de-compression and codec to format the stream signals into the electrical signals for the display 711. The stream processor 708 has a dedicated connection directly to the display 711. Processed signals by stream processor 708 are directly passed on to the display 711 without delays that is inherently unavoidable through a bus system. Connection from the display 711 to the bus 701 in this scenario is primarily used for passing control signals and displaying error messages generated within the set-top box 111.

The set-top box 111 can send and receive data, including program code, through the network(s), the network link 719, and the communication interface 717. In this example, a server (not shown) might transmit requested code belonging to an application program for implementing an exemplary embodiment through the network 725, the broadband router 102, the local network 721 and the communication interface 717. The processor 703 may execute the transmitted code while being received and/or store the code in the storage device 709, or other non-volatile storage for later execution. In this manner, the set-top box 111 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, twisted copper wires and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a hard disk, a CD-ROM, a CDRW, a DVD, a RAM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such as scenario, the remote computer sends the instructions over the network 725 to the broadband router 102 through an optical fiber cable (727). The broadband router 102 receives the data and formats the data into IEEE 802.11G packets, which are then modulated and amplified before being transmitted to an RF antenna (not shown). The wireless signals are carried by the carrier waves across a free space and are received by the wireless LAN switch 721. The LAN switch 721 processes the wireless signals and encapsulates the data into Ethernet™ packets which are then transmitted through the LAN connection 719 to the communication interface 717. The communication interface 717 processes the Ethernet™ packets to retrieve the instructions borne in the Ethernet™ packets and places the data on the bus 701. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method of adding a grid over a camera view of a geographic area of an event, comprising:
   receiving at a stream server the camera view of the geographic area of the event sent over a communication network from a camera set positioned at the event, the stream server comprising a processor and a memory, wherein the processor:
   maps a coordinate system to the geographical area of the event;
   provides a visualization of the coordinate system over the camera view of the geographic area of the event; and
   sends the visualization of the coordinate system over the camera view of the geographic area of the event over the communication network to a user display for viewing by a user,
   wherein the visualization of the coordinate system comprises a virtual grid over the camera view of the geographic area of the event.

2. A method according to claim 1, wherein values of coordinates in the coordinate system correspond to the geographical location of the event.

3. A method according to claim 2, wherein the values of the coordinates are independent of a viewing perspective of a user.

4. A method according to claim 1, wherein the virtual grid comprises GPS coordinates.

5. A method according to claim 4, further comprising projecting the GPS coordinates as a light colored mesh over a viewing field.

6. A method according to claim 1, wherein the processor further:
receives feeds from different viewing angles of an event from a plurality of cameras; and
identifies, via the virtual grid, a plurality of locations at the event that are within a section of the virtual grid,
wherein each of the plurality of locations within a section of the virtual grid of the event is different from one another, and
wherein the identifying occurs independent of the different viewing angles from the plurality of cameras.

7. The method according to claim 6, wherein the processor further:
provides different users within a virtual community with a common reference when a subject of interest at the event is viewed from different angles by the different users.

8. An apparatus comprising:
at least one processor; and
at least one memory including computer program code for one or more programs, the at least one memory and the computer program code configured to, with the at least one processor, cause the apparatus to perform at least the following:
receive a camera view of a geographic area of an event sent over a communication network from a camera set positioned at the event;
map a coordinate system to the geographical area of the event;
provide a visualization of the coordinate system over the camera view of the geographic area of the event; and
send the visualization of the coordinate system over the camera view of the geographic area of the event over the communication network to a user display for viewing by a user,
wherein the visualization of the coordinate system comprises a virtual grid over the camera view of the geographic area of the event.

9. The apparatus of claim 8, wherein values of coordinates in the coordinate system correspond to the geographical location of the event.

10. The apparatus according to claim 9, wherein the values of the coordinates are independent of a viewing perspective of a user.

11. The apparatus according to claim 8, wherein the virtual grid comprises GPS coordinates.

12. The apparatus according to claim 11, wherein the apparatus is further configured to:
project the GPS coordinates as a light colored mesh over a viewing field.

13. The apparatus according to claim 8, wherein the apparatus is further configured to:
receive different viewing angles of the event from a plurality of cameras; and
identify, via the virtual grid, a plurality of locations at the event that are within a section of the virtual grid,
wherein each of the plurality of locations within a section of the virtual grid of the event is different from one another, and
wherein the apparatus is configured to identify the one or more locations independent of the different viewing angles from the plurality of cameras.

14. The apparatus according to claim 13, wherein the apparatus is further configured to:
provide different users within a virtual community with a common reference when a subject of interest at the event is viewed from different angles by the different users.

15. The apparatus according to claim 8, wherein the apparatus comprises a stream server.

16. A non-transitory computer-readable storage medium carrying one or more sequences of one or more instructions stored thereon executed by a processor to perform a method of adding a grid over a camera view of a geographic area of an event, the method comprising:
receiving a camera view of a geographic area of the event sent over a communication network from a camera set positioned at the event;
mapping a coordinate system to the geographical area of the event;
providing a visualization of the coordinate system over the camera view of the geographic area of the event; and
sending the visualization of the coordinate system over the camera view of the geographic area of the event over the communication network to a user display for viewing by a user,
wherein the visualization of the coordinate system comprises a virtual grid over the camera view of the geographic area of the event.

17. The non-transitory computer-readable storage medium of claim 16, wherein the method further comprises:
receiving different viewing angles of the event from a plurality of cameras; and
identifying, via the virtual grid, a plurality of locations at the event that are within a section of the virtual grid,
wherein each of the plurality of locations within a section of the virtual grid of the event is different from one another, and
wherein the apparatus is configured to identify the one or more locations independent of the different viewing angles from the plurality of cameras.

* * * * *